(12) United States Patent
Bednar

(10) Patent No.: US 11,391,536 B2
(45) Date of Patent: Jul. 19, 2022

(54) CROSSBOW DISPLAY

(71) Applicant: Hunter's Manufacturing Company, Inc., Suffield, OH (US)

(72) Inventor: Richard Bednar, Akron, OH (US)

(73) Assignee: Hunter's Manufacturing Company, Inc., Suffield, OH (US)

( * ) Notice: Subject to any disclaimer, the term of this patent is extended or adjusted under 35 U.S.C. 154(b) by 116 days.

(21) Appl. No.: 17/113,765

(22) Filed: Dec. 7, 2020

(65) Prior Publication Data

US 2021/0172699 A1 Jun. 10, 2021

Related U.S. Application Data

(60) Provisional application No. 62/944,818, filed on Dec. 6, 2019.

(51) Int. Cl.
| | |
|---|---|
| *F41B 5/12* | (2006.01) |
| *G09F 19/00* | (2006.01) |
| *F16M 13/02* | (2006.01) |
| *F41B 5/14* | (2006.01) |
| *A63B 71/00* | (2006.01) |

(52) U.S. Cl.
CPC ............ *F41B 5/12* (2013.01); *A63B 71/0036* (2013.01); *F16M 13/02* (2013.01); *F41B 5/1453* (2013.01); *G09F 19/00* (2013.01)

(58) Field of Classification Search
CPC ...... A63B 71/0036; F41B 5/12; F41B 5/1453; F41B 5/1457; G09F 19/00
See application file for complete search history.

(56) References Cited

U.S. PATENT DOCUMENTS

| | | | | |
|---|---|---|---|---|
| 2,975,888 | A * | 3/1961 | Paynton, Sr. ......... | B65D 59/04 206/315.11 |
| 4,480,774 | A * | 11/1984 | Smith ...................... | A45F 3/02 224/916 |
| 5,913,431 | A * | 6/1999 | Rathjen ................... | F41B 5/14 D6/552 |
| D449,992 | S * | 11/2001 | Blackburn ............ | F41B 5/1457 D9/457 |
| D497,804 | S * | 11/2004 | Hetzel .................... | A45F 3/02 D9/418 |
| 6,935,495 | B1 * | 8/2005 | Mc Kenzie ........... | F41B 5/1457 206/315.11 |
| D579,766 | S * | 11/2008 | Barnett .................... | D9/414 |
| 8,047,413 | B2 * | 11/2011 | Arajakis .................. | A45F 3/14 224/916 |
| 8,701,332 | B1 * | 4/2014 | Chavez ................. | A01M 31/06 43/2 |
| D708,512 | S * | 7/2014 | Barnett .................... | D9/418 |
| 8,978,949 | B2 * | 3/2015 | Arajakis ................ | F41B 5/1457 224/644 |
| 9,664,474 | B2 * | 5/2017 | Barnett .................. | F41B 5/1457 |
| 2014/0024503 | A1 | 1/2014 | Chiang | |
| 2017/0347643 | A1 | 12/2017 | Sheedfar | |

* cited by examiner

*Primary Examiner* — John A Ricci

(74) *Attorney, Agent, or Firm* — Emerson Thomson Bennett, LLC

(57) ABSTRACT

A crossbow display may include a crossbow and a display board. The crossbow may be displayed in the un-cocked state with the display board supported to the crossbow. The display board may include one or more images that depict at least a portion of the crossbow in the cocked state. The crossbow display enables a prospective purchaser/user to simultaneously visualize at least part of both the un-cocked and cocked states of the crossbow.

20 Claims, 13 Drawing Sheets

CROSSBOW DISPLAY

This application claims the benefit of U.S. Provisional Application No. 62/944,818, titled CROSSBOW DISPLAY, filed Dec. 6, 2019, the entirety of which is fully incorporated by reference herein.

I. BACKGROUND

A. Field of the Invention

This invention generally relates to methods and apparatuses related to crossbows and more specifically to methods and apparatuses related to displaying crossbows.

B. Description of Related Art

Crossbows have been used for many years as a weapon for hunting and fishing, and for target shooting. In general, a crossbow includes a main beam and a bow assembly supported to the main beam. The bow assembly may have a pair of bow limbs and a bowstring. Often the bow assembly has wheels on the bow limbs that receive the bowstring. A trigger mechanism may be supported to the main beam and operable to hold the bowstring and to release the bowstring to fire the crossbow to shoot an arrow (sometimes referred to as a bolt). When the trigger mechanism is holding the bowstring, the crossbow is said to be in a cocked state. When the trigger mechanism is not holding the bowstring, the crossbow is said to be in an un-cocked state.

Prospective crossbow purchasers/users are naturally interested in gathering information about how a particular crossbow will look and operate. Sometimes such purchasers/users can personally operate the crossbow—cock it, fire it, etc.—or observe someone else operate it. Such crossbow operation, however, is not always possible and in some cases may be undesirable. Thus, prospective crossbow purchasers/users often can only observe crossbows as they are displayed—such as on a wall mount, display rack or hanger. It is generally considered unsafe, however, to display a crossbow in a cocked state. Therefore, prospective crossbow purchasers/users are only able to observe a displayed crossbow in an un-cocked state—preventing such purchasers/users from seeing the crossbow in a cocked state.

What is needed, then, is a way to display a crossbow in a safe manner that nonetheless enables prospective purchasers/users to visualize both the un-cocked and cocked states. This invention will provide numerous other advantages as will be readily understood by a person of skill in the art.

II. SUMMARY

According to some embodiments of this invention, a crossbow display may comprise: a crossbow that: 1) has a main beam; 2) has a bow assembly supported to the main beam that includes: first and second bow limbs; first and second wheels pivotally supported to the first and second bow limbs, respectively; and a bowstring operatively received on the first and second wheels; 3) has a trigger mechanism supported to the main beam and operable to: hold the bowstring; and release the bowstring to fire the crossbow; 4) is adjustable between an un-cocked state and a cocked state; 5) when in the un-cocked state: the first wheel may be in a first wheel first position; and the second wheel may be in a second wheel first position; and 6) when in the cocked state: the trigger mechanism may hold the bowstring; the first wheel may be in a first wheel second position distinct from the first wheel first position; and the second wheel may be in a second wheel second position distinct from the second wheel first position; and a display board that: 1) has first and second sides; 2) has first and second distinct images; and 3) may be designed to be removed from the crossbow when the crossbow is not displayed. When the crossbow is displayed: 1) the crossbow may be in the un-cocked state; 2) the first side of the display board may be supported to the first bow limb; 3) the second side of the display board may be supported to the second bow limb; 4) the first image may depict at least a portion of the first wheel in the first wheel second position; and 5) the second image may depict at least a portion of the second wheel in the second wheel second position.

According to some embodiments of this invention, a method of displaying a crossbow may comprise the steps of: A) providing a crossbow that: 1) has a main beam; 2) has a bow assembly supported to the main beam that includes: first and second bow limbs; first and second wheels supported to the first and second bow limbs, respectively; and a bowstring operatively received on the first and second wheels; 3) has a trigger mechanism supported to the main beam and operable to: hold the bowstring; and release the bowstring to fire the crossbow; 4) is adjustable between an un-cocked state and a cocked state; 5) when in the un-cocked state: the first wheel may be in a first wheel first position; and the second wheel may be in a second wheel first position; and 6) when in the cocked state: the trigger mechanism holds the bowstring; the first wheel may be in a first wheel second position distinct from the first wheel first position; and the second wheel may be in a second wheel second position distinct from the second wheel first position; B) providing a display board that: 1) has first and second distinct images; and 2) is designed to be removed from the crossbow when the crossbow is not displayed; and C) displaying the crossbow by: 1) placing the crossbow into the un-cocked state; 2) supporting the display board to the crossbow with: (a) the first image depicting at least a portion of the first wheel in the first wheel second position; and (b) the second image depicting at least a portion of the second wheel in the second wheel second position.

According to some embodiments of this invention, a crossbow display may comprise: a crossbow that: 1) has a main beam; 2) has a bow assembly supported to the main beam that includes: first and second bow limbs; and a bowstring operatively received on the first and second bow limbs; 3) has a trigger mechanism supported to the main beam and operable to: hold the bowstring; and release the bowstring to fire the crossbow; 4) is adjustable between an un-cocked state and a cocked state; 5) when in the un-cocked state: the bow assembly may be in a first position; and 6) when in the cocked state: the trigger mechanism may hold the bowstring; and at least a portion of the bow assembly may be in a second position distinct from the first position; and a display board that: 1) has a first image; and 2) is designed to be removed from the crossbow when the crossbow is not displayed. When the crossbow is displayed: 1) the crossbow may be in the un-cocked state; 2) the display board may be supported to the crossbow; and 3) the first image may depict at least a portion of the bow assembly in the second position.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DEFINITIONS

The following definitions are controlling for the disclosed inventions:

"Arrow" means a projectile that is shot with (or fired by or launched by) a bow assembly.

"Bow" means a bent, curved, or arched object. A bow includes a pair of bow limbs.

"Bow Assembly" means a weapon comprising a bow and a bowstring that shoots (or fires or propels) arrows powered by the elasticity of the bow and the drawn bowstring.

"Bowstring" means a string or cable attached to a bow and used to shoot (or fire or propel) arrows.

"Compound Bow" means a bow that has wheels—such as pulleys or cams—at each end of the bow through which the bowstring passes. A compound bow may include strings or cables in addition to the bowstring that interconnect the wheels to other portions of the bow. Other types of bows may also use strings or cables in addition to the bowstring.

"Crossbow" means a weapon comprising a bow assembly and a trigger mechanism both mounted to a main beam.

"Draw Weight" means the amount of force required to draw or pull the bowstring on a crossbow into a cocked state.

"Main Beam" means the longitudinal structural member of a weapon used to support the trigger mechanism and often other components as well. For crossbows, the main beam also supports the bow assembly. A main beam may include a stock member and a barrel. Sometimes a barrel is a distinct component from the stock member that is attached to the stock member. Other times the barrel and stock member comprise a single component.

"Trigger Mechanism" means the portion of a weapon that shoots, fires or releases the projectile of a weapon. As applied to crossbows, trigger mechanism means any device that holds the bowstring of a crossbow in the drawn or cocked state and which can thereafter be operated to release the bowstring out of the cocked state to shoot an arrow.

"Weapon" means any device that can be used in fighting or hunting that shoots or fires a projectile including bow assemblies and crossbows.

V. DETAILED DESCRIPTION

Figure 1:
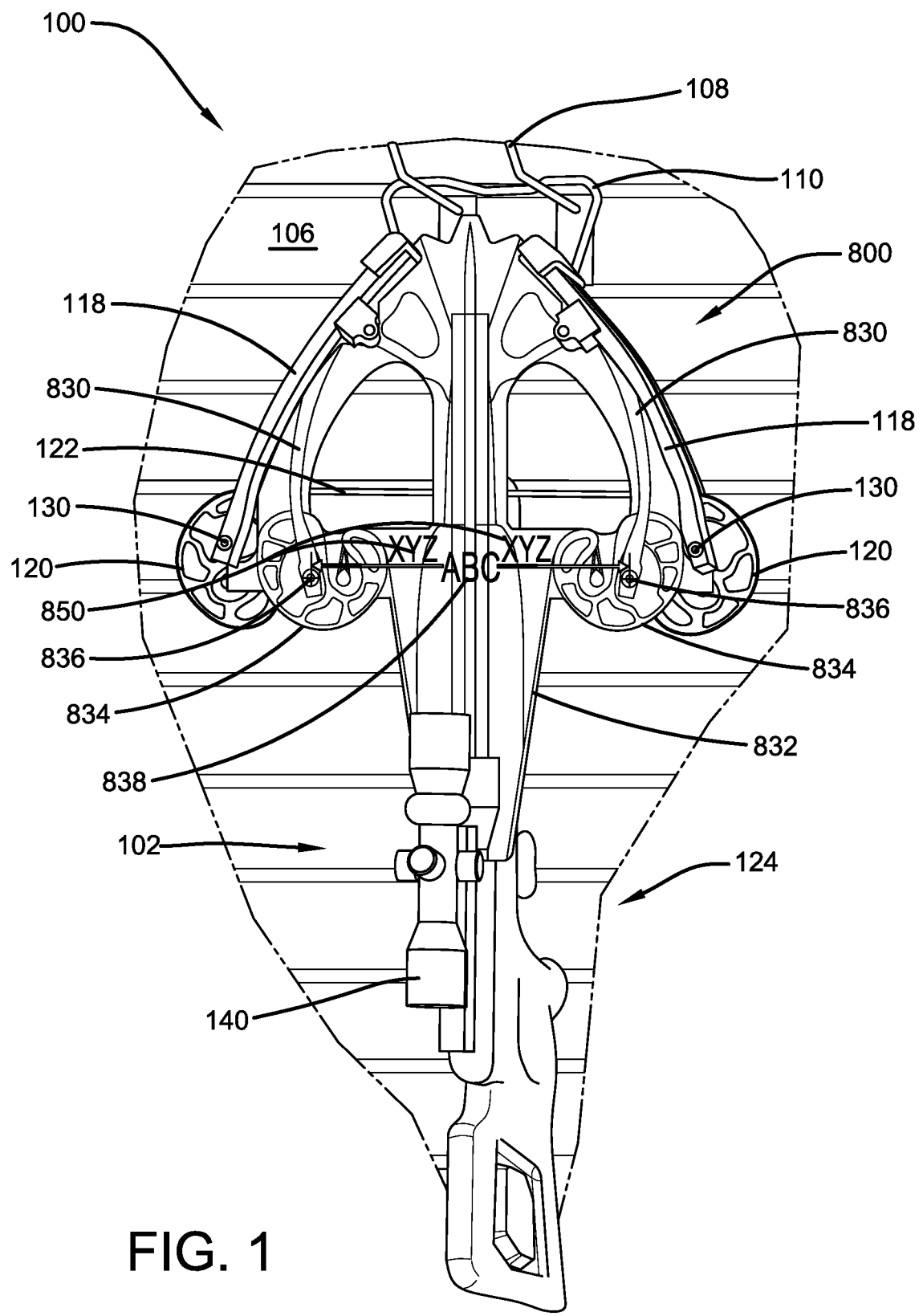
FIG. 1 is a perspective top view of a crossbow display including a crossbow and a display board.

Referring now to the drawings wherein the showings are for purposes of illustrating embodiments of the invention only and not for purposes of limiting the same, and wherein like reference numerals are understood to refer to like components, FIG. 1 illustrates a crossbow display 100 according to some embodiments of this invention. The crossbow display 100 may include a crossbow 102 and a display board 800 which will be described in turn below. The crossbow display 100 may be mounted to a mounting surface 106, such as to wall, as shown, using hooks 108 that receive the crossbow stirrup 110, but the crossbow display 100 may be exhibited in any manner chosen with the sound judgement of a person of skill in the art—with or without a mounting surface.

With reference now to FIGS. 1-7, it should be understood that any crossbow that is adjustable between an un-cocked state and a cocked state and chosen with the sound judgement of a person of skill in the art will work with the crossbow display of this invention. Non-limiting examples of crossbow types that work with this invention include: Recurve Crossbows, Compound Crossbows, Rifle Crossbows, and Reverse Draw Crossbows.

FIGS. 1-4 show compound crossbow 102 that may include a main beam 112 and a bow assembly 114 supported to the main beam 112. The bow assembly 114 may be supported directly to the main beam 112 or may be, in the embodiment shown, supported to the main beam 112 via a riser 116. The bow assembly 114 may include first and second bow limbs 118, 118 that may be flexible as will be discussed further below. The bow assembly 114 may also include a bowstring 122 operatively received on the bow limbs 118, 118. In some embodiments, first and second wheels 120, 120 (which may be pulleys, cams, or the like) may be pivotally supported to the first and second bow limbs 118, 118, respectively, about pivot axes 130, 130. In this case the bowstring 122 may be operatively received on the bow limbs by being received on the first and second wheels 120, 120, as shown. The pivot axes 130, 130 may be defined by an axle or pin that the corresponding wheel 120, 120 rotates around. Each bowstring wheel 120 may have a bowstring reception surface to which the bowstring 122 is received. For the embodiment shown, the bowstring reception surface is a groove. One end of the bowstring 122 may be received on the bowstring reception surface of one wheel 120 and the opposite end of the bowstring 122 may be received on the bowstring reception surface of the other wheel 120.

With continuing reference to FIGS. 1-4, a trigger mechanism 124 may be supported to the main beam 112 and operable to: hold the bowstring 122; and release the bowstring 122 to fire the crossbow 102 and shoot an arrow 144. The trigger mechanism 124 may be operable to hold the bowstring 122 (thereby placing the crossbow in the cocked state) and operable to release the bowstring 122 to fire the crossbow 102. The crossbow 102 may have a proximal end 126 and a distal end 128 and the trigger mechanism 124 may be positioned closer to the proximal end 126 than the distal end 128, as shown. The crossbow 102 may have a top 136, a bottom 138 a first crossbow opening 132 between the main beam 112 and one bow limb 118, and a second crossbow opening 134 between the main beam 112 and the other bow limb 118, as shown. The crossbow 102 may, or may not, have numerous other components that are well known to those of skill in the art such as a scope 140, a cocking mechanism 142 and a stirrup 110.

Figure 2:
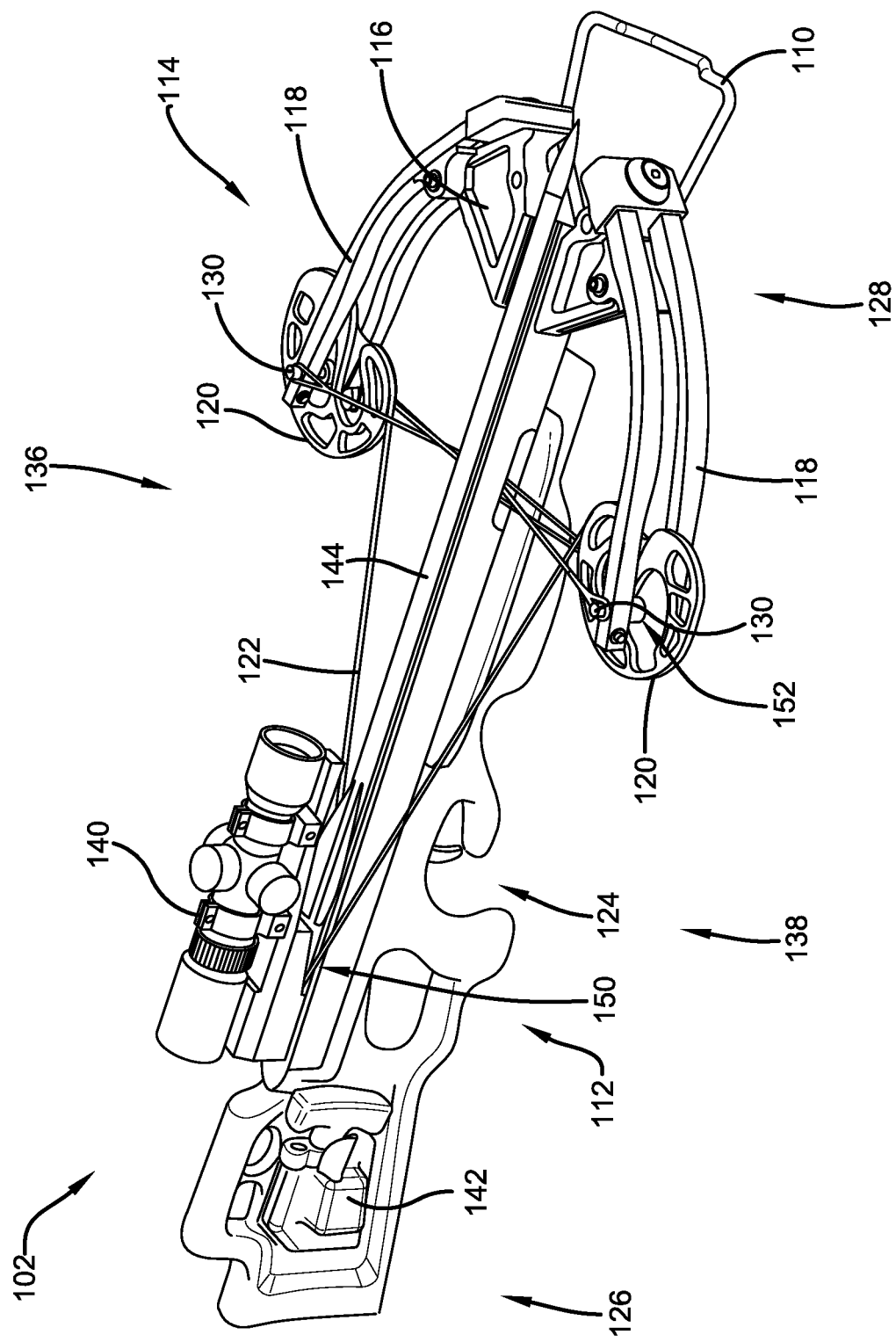
FIG. 2 is a perspective side view of the crossbow shown in FIG. 1.
Figure 3:
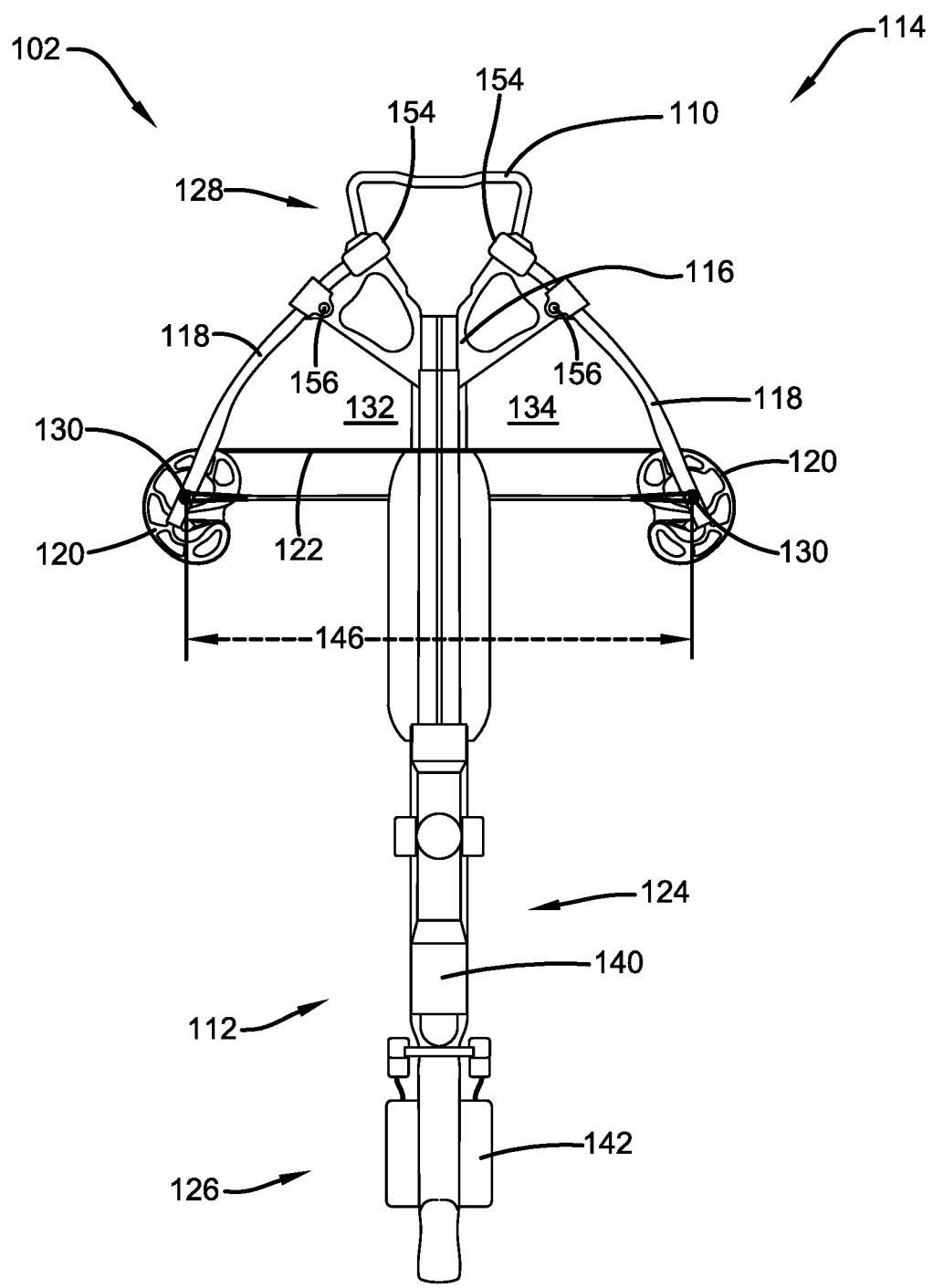
FIG. 3 is a top view of the crossbow shown in FIG. 2 in an un-cocked state.
Figure 4:
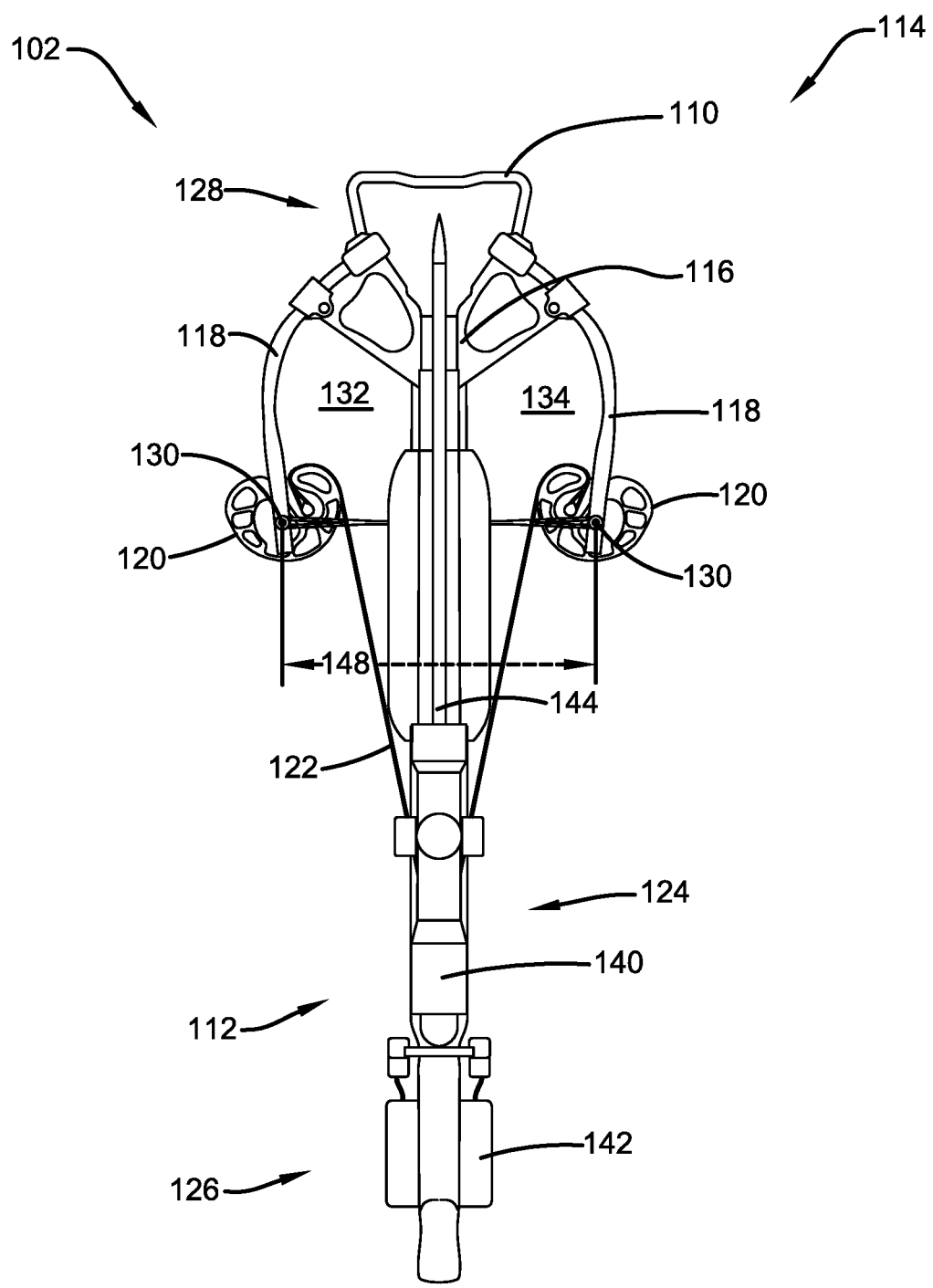
FIG. 4 is a top view of the crossbow shown in FIG. 2 in a cocked state.

Still referring to FIGS. 1-4, the crossbow 102 may be adjustable between an un-cocked state (FIGS. 1 and 3) and a cocked state (FIGS. 2 and 4). When in the un-cocked state, the bow assembly 114 may be in a first position. When in the cocked state, the trigger mechanism 124 may hold the bowstring 122 and at least a portion of the bow assembly 114 may be in a second position distinct from the first position. In some embodiments, the first position includes each bow limb 118, 118 in a bow limb first position and the second position includes each bow limb 118, 118 in a bow limb second position distinct from the bow limb first position. In some embodiments, the first position includes each wheel 120, 120 in a wheel first position and the second position includes each wheel 120, 120 in a wheel second position distinct from the wheel first position. In some embodiments, the first position includes the pivot axes 130, 130 separated by a first distance 146 (see FIG. 3) and the second position includes the pivot axes 130, 130 separated by a second distance 148 (see FIG. 4) distinct from the first distance 146. The flexibility of the bow limbs 118, 118 may provide for the distinct positions and distances as is well known to those of skill in the art. The bowstring 110 may be unwrapped from the bowstring wheels 120, 120 to cock the crossbow 102 and wrapped onto the bowstring wheels 120, 120 to fire the crossbow 102 as is well known by those of skill in the art. Because the operation of bow assemblies and trigger mechanisms are well known to those of skill in the art, no further details will be provided here.

Figure 5:
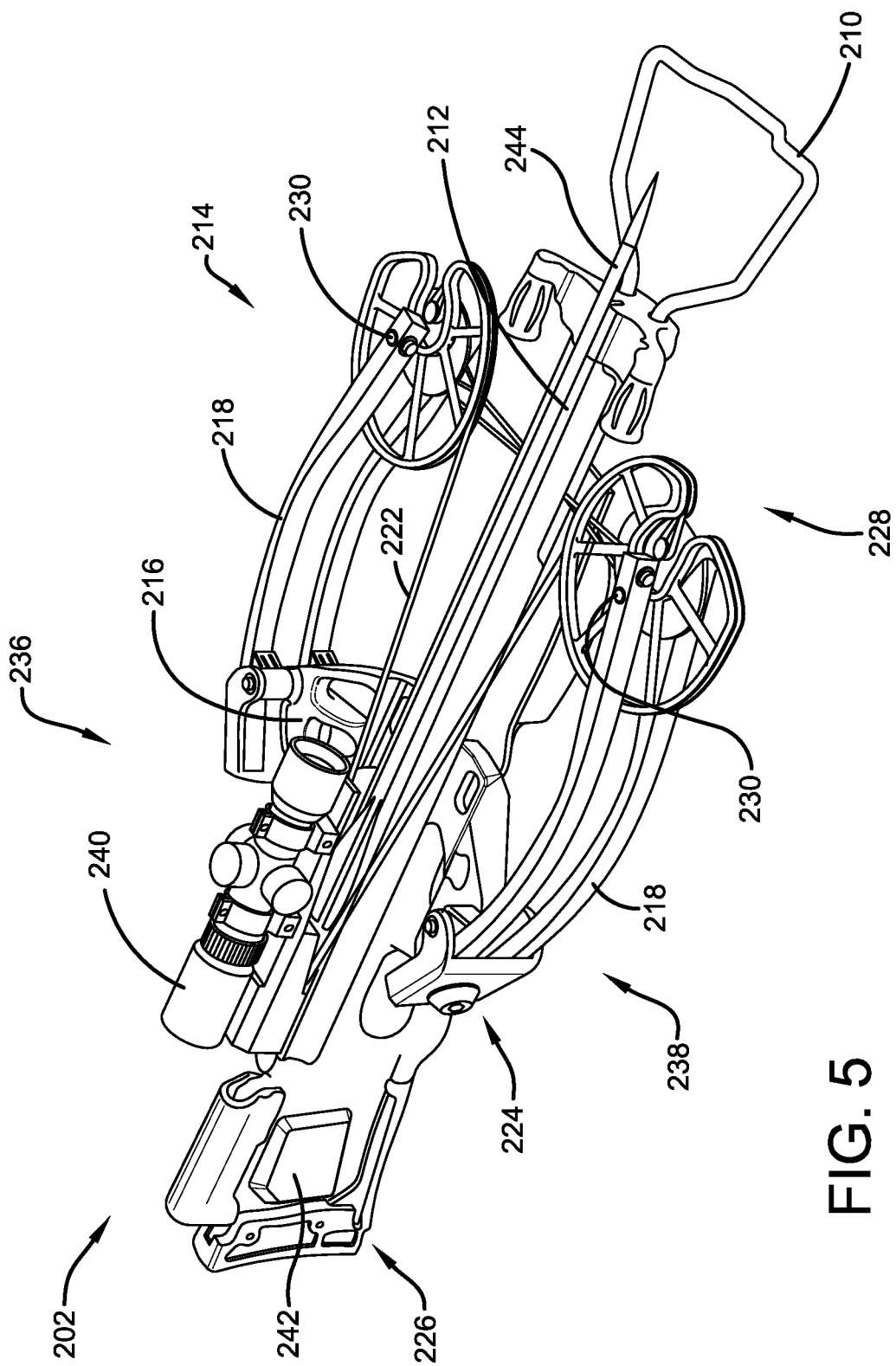
FIG. 5 is a perspective side view of a reverse draw crossbow.
Figure 6:
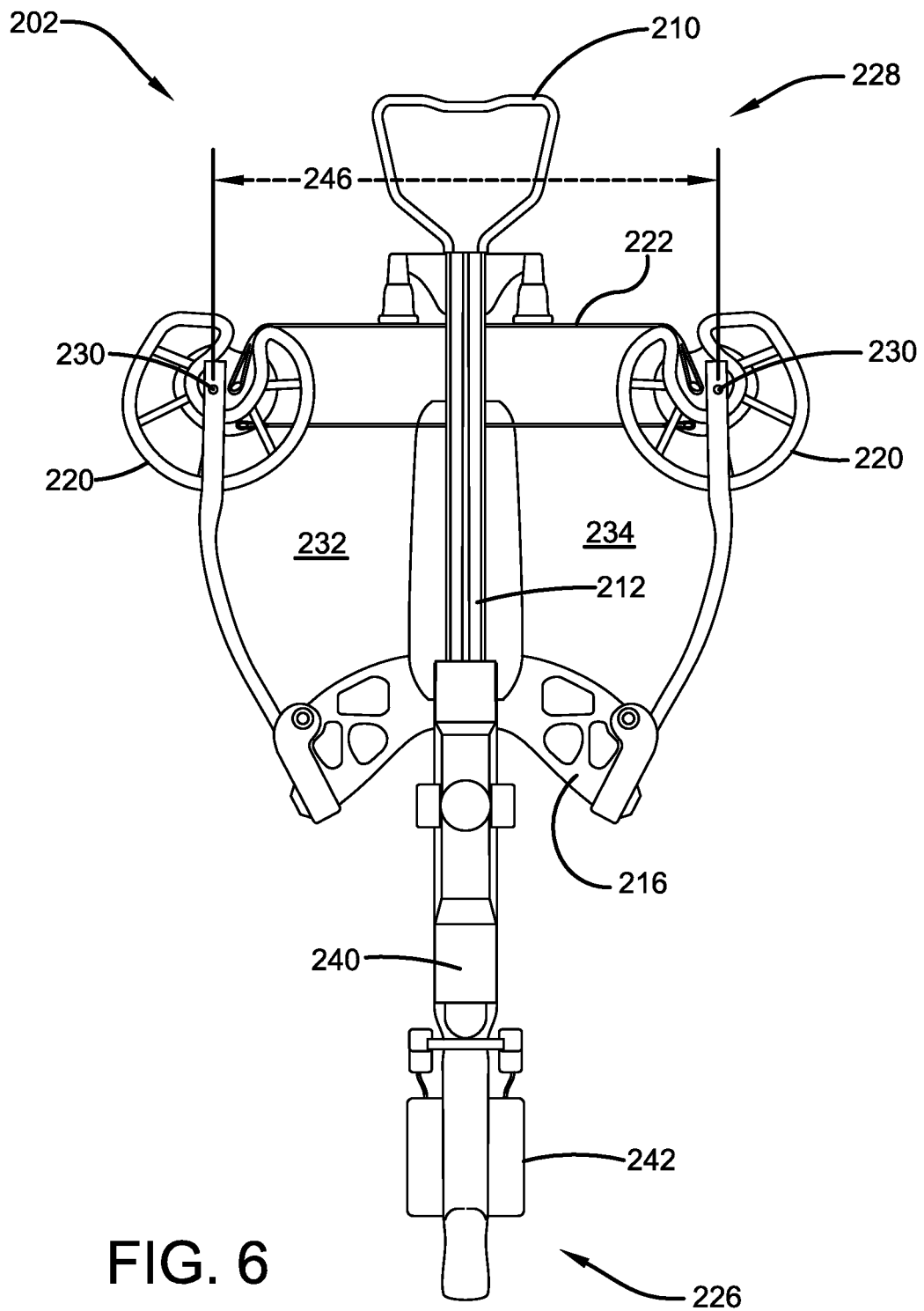
FIG. 6 is a top view of the crossbow shown in FIG. 5 in an un-cocked state.
Figure 7:
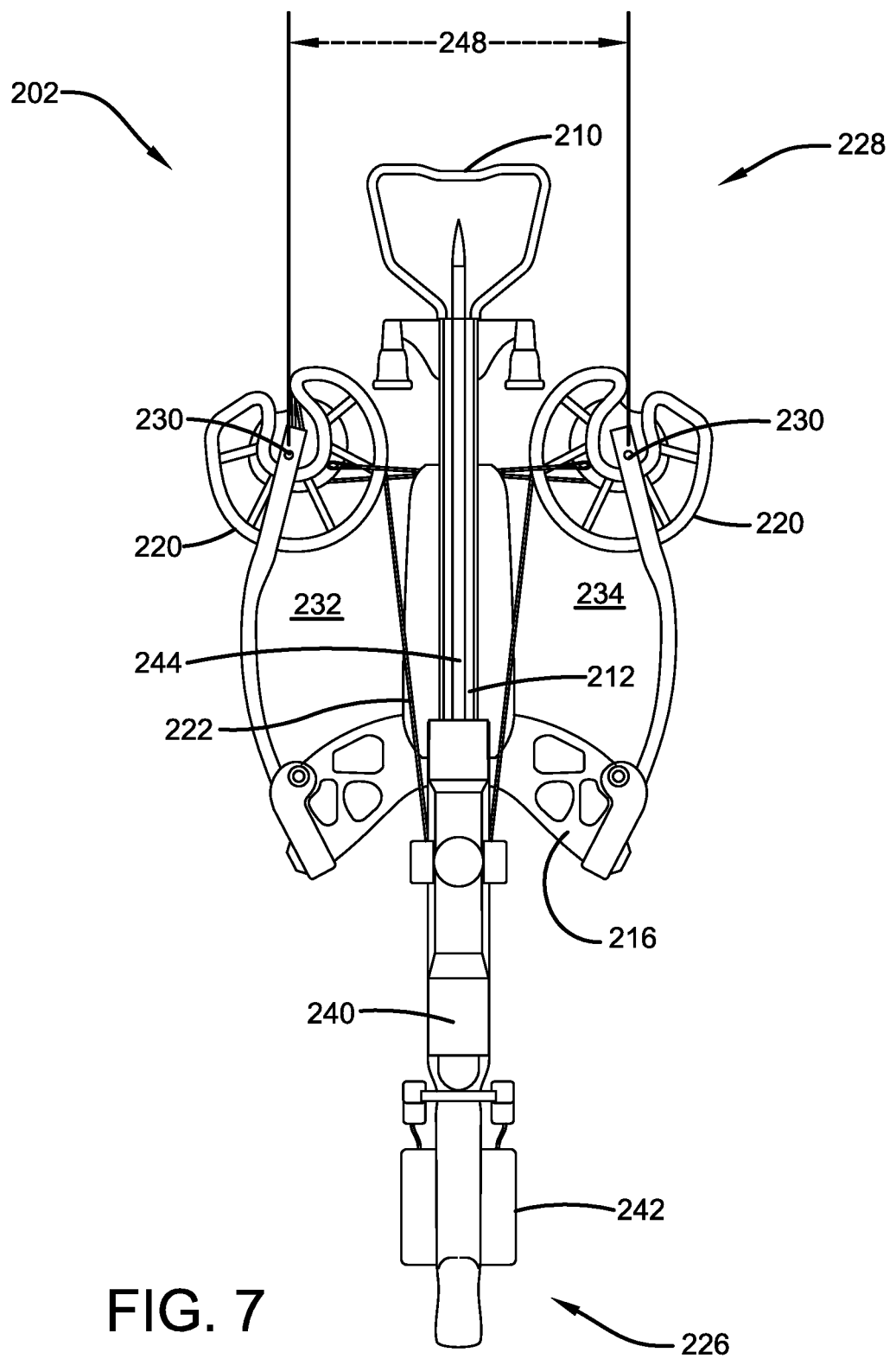
FIG. 7 is a top view of the crossbow shown in FIG. 5 in a cocked state.

FIGS. 5-7 show a reverse draw crossbow 202 that may include a main beam 212 and a bow assembly 214 supported to the main beam 212. The bow assembly 214 may be supported directly to the main beam 212 or may be, in the embodiment shown, supported to the main beam 212 via a riser 216. The bow assembly 214 may include first and second bow limbs 218, 218 that may be flexible as will be discussed further below. The bow assembly 214 may also include a bowstring 222 operatively received on the bow limbs 218, 218. In some embodiments, first and second wheels 220, 220 (which may be pulleys, cams, or the like) may be pivotally supported to the first and second bow limbs 218, 218, respectively, about pivot axes 230, 230. In this case the bowstring 222 may be operatively received on the bow limbs by being received on the first and second wheels 220, 220, as shown. The pivot axes 230, 230 may be defined by an axle or pin that the corresponding wheel 220, 220 rotates around. Each bowstring wheel 220 may have a bowstring reception surface to which the bowstring 222 is received. For the embodiment shown, the bowstring reception surface is a groove. One end of the bowstring 222 may be received on the bowstring reception surface of one wheel 220 and the opposite end of the bowstring 222 may be received on the bowstring reception surface of the other wheel 220.

With continuing reference to FIGS. 5-7, a trigger mechanism 224 may be supported to the main beam 212 and operable to: hold the bowstring 222; and release the bowstring 222 to fire the crossbow 202 and shoot an arrow 244. The trigger mechanism 224 may be operable to hold the bowstring 222 (thereby placing the crossbow in the cocked state) and operable to release the bowstring 222 to fire the crossbow 202. The crossbow 202 may have a proximal end 226 and a distal end 228 and the trigger mechanism 224 may be positioned closer to the proximal end 226 than the distal end 228, as shown. The crossbow 202 may have a top 236, a bottom 238, a first crossbow opening 232 between the main beam 212 and one bow limb 218 and a second crossbow opening 234 between the main beam 212 and the other bow limb 218, as shown. The crossbow 202 may, or may not, have numerous other components that are well known to those of skill in the art such as a scope 240, a cocking mechanism 242 and a stirrup 210.

Still referring to FIGS. 5-7, the crossbow 202 may be adjustable between an un-cocked state (FIG. 6) and a cocked state (FIGS. 5 and 7). When in the un-cocked state, the bow assembly 214 may be in a first position. When in the cocked state, the trigger mechanism 224 may hold the bowstring 222 and at least a portion of the bow assembly 214 may be in a second position distinct from the first position. In some embodiments, the first position includes each bow limb 218, 218 in a bow limb first position and the second position includes each bow limb 218, 218 in a bow limb second position distinct from the bow limb first position. In some embodiments, the first position includes each wheel 220, 220 in a wheel first position and the second position includes each wheel 220, 220 in a wheel second position distinct from the wheel first position. In some embodiments, the first position includes the pivot axes 230, 230 separated by a first distance 246 (see FIG. 6) and the second position includes the pivot axes 230, 230 separated by a second distance 248 (see FIG. 7) distinct from the first distance 246. The flexibility of the bow limbs 218, 218 may provide for the distinct positions and distances as is well known to those of skill in the art. The bowstring 210 may be unwrapped from the bowstring wheels 216, 216 to cock the crossbow 202 and wrapped onto the bowstring wheels 216, 216 to fire the crossbow 202 as is well known by those of skill in the art. Because the operation of bow assemblies and trigger mechanisms are well known to those of skill in the art, no further details will be provided here.

A display board that matches a crossbow may be used with the crossbow to form a crossbow display. The display board may be of any type, size, style, form and material chosen with the sound judgement of a person of skill in the art. In some embodiments, the display board may be generally planar with a top and a bottom and may be formed of a relatively thin yet sturdy material such as cardboard. The display board may be designed to be removed from the crossbow when the crossbow is not displayed. Non-limiting display board examples will be now be described.

Figure 8:
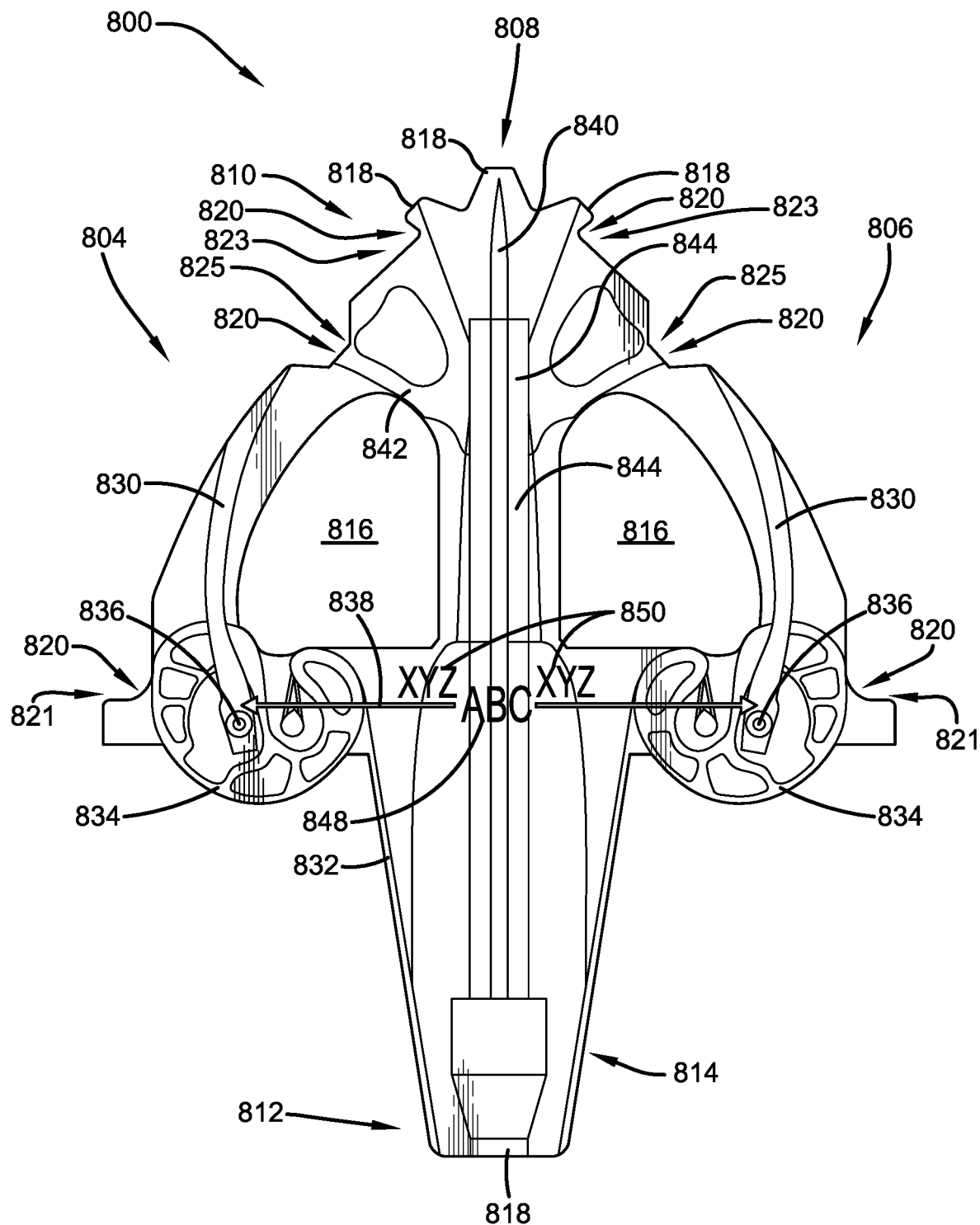
FIG. 8 is a top view of a display board.
Figure 9:
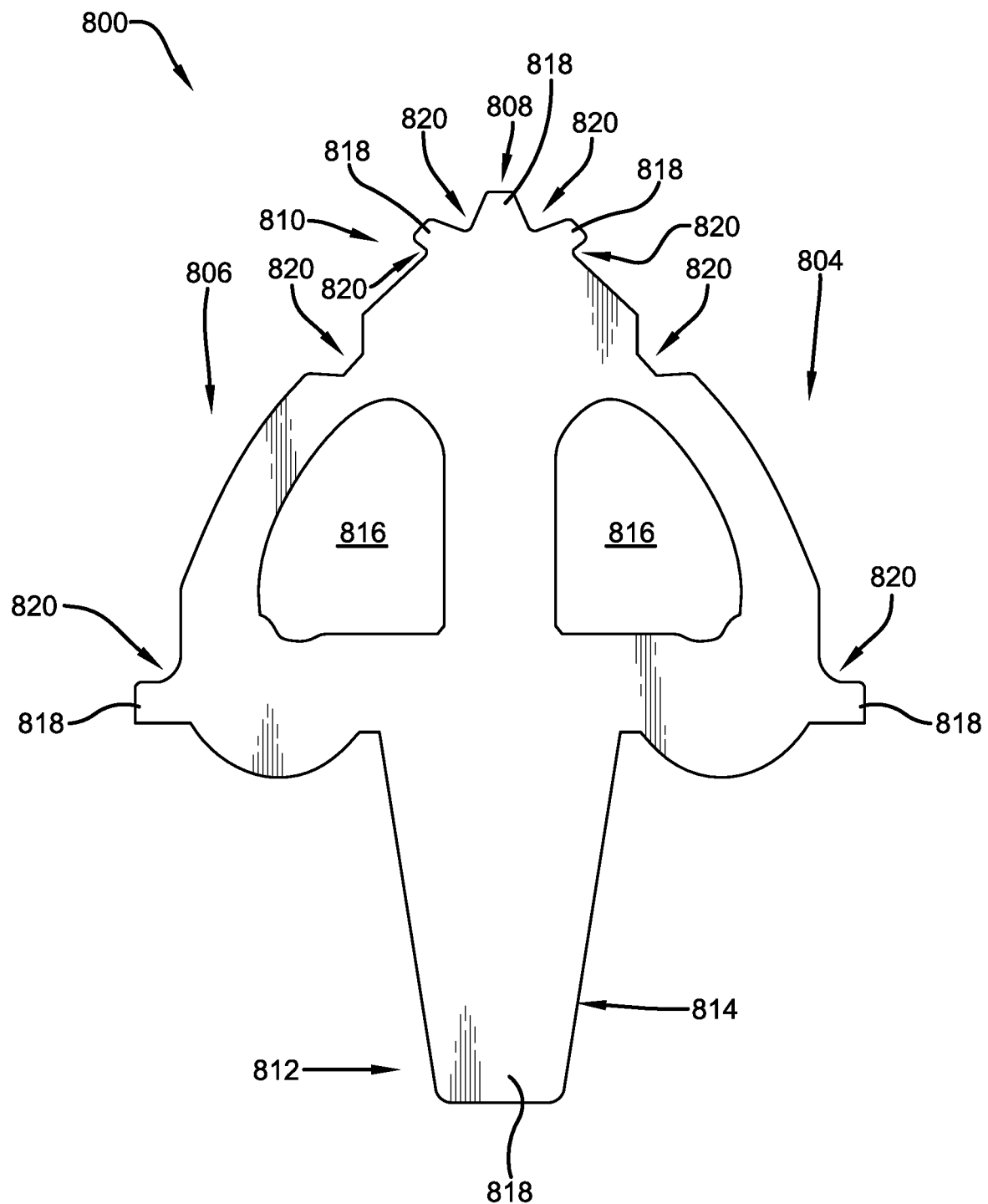
FIG. 9 is a bottom view of the display board shown in FIG. 8.
Figure 10:
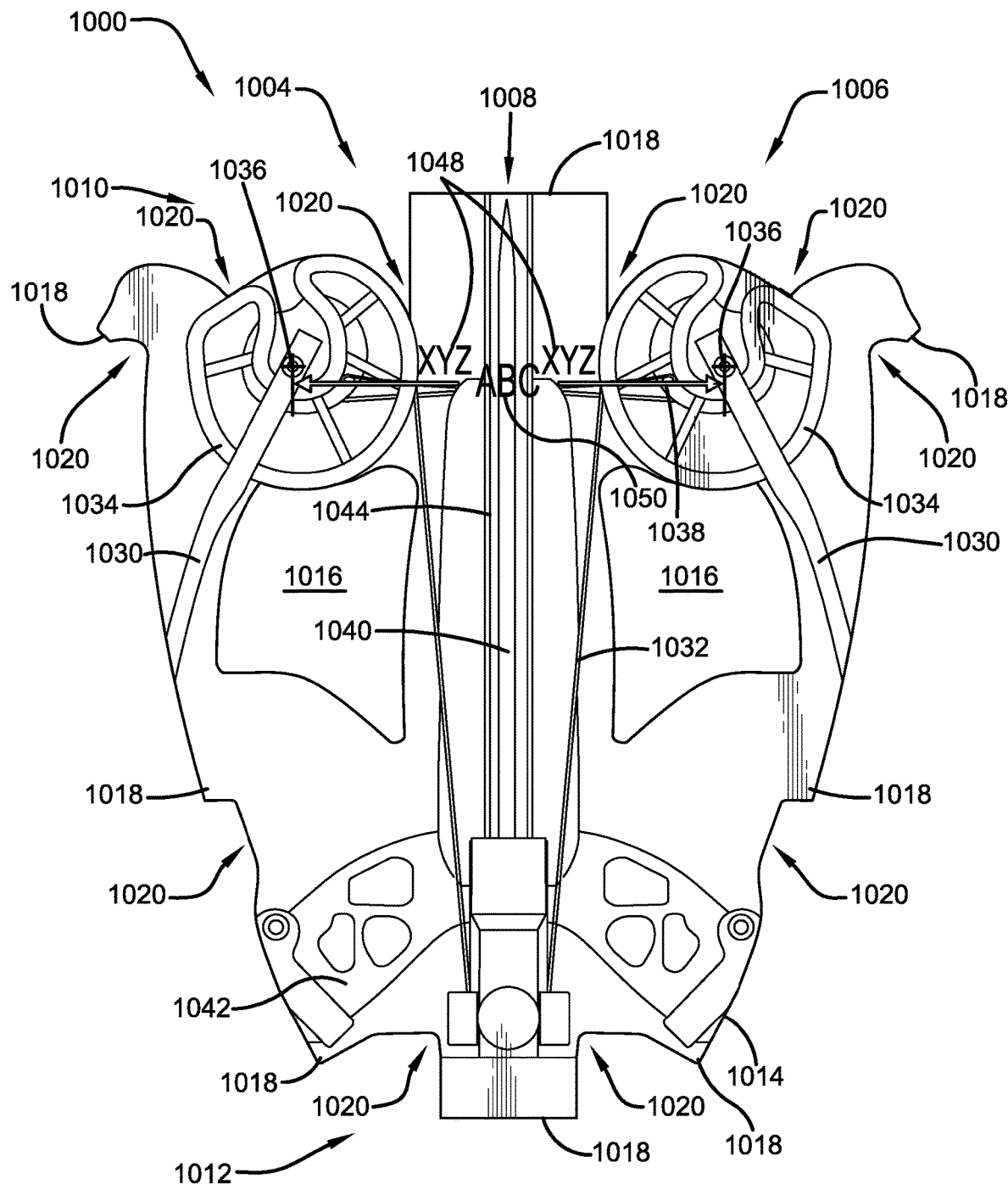
FIG. 10 is a top view of a display board.
Figure 11:
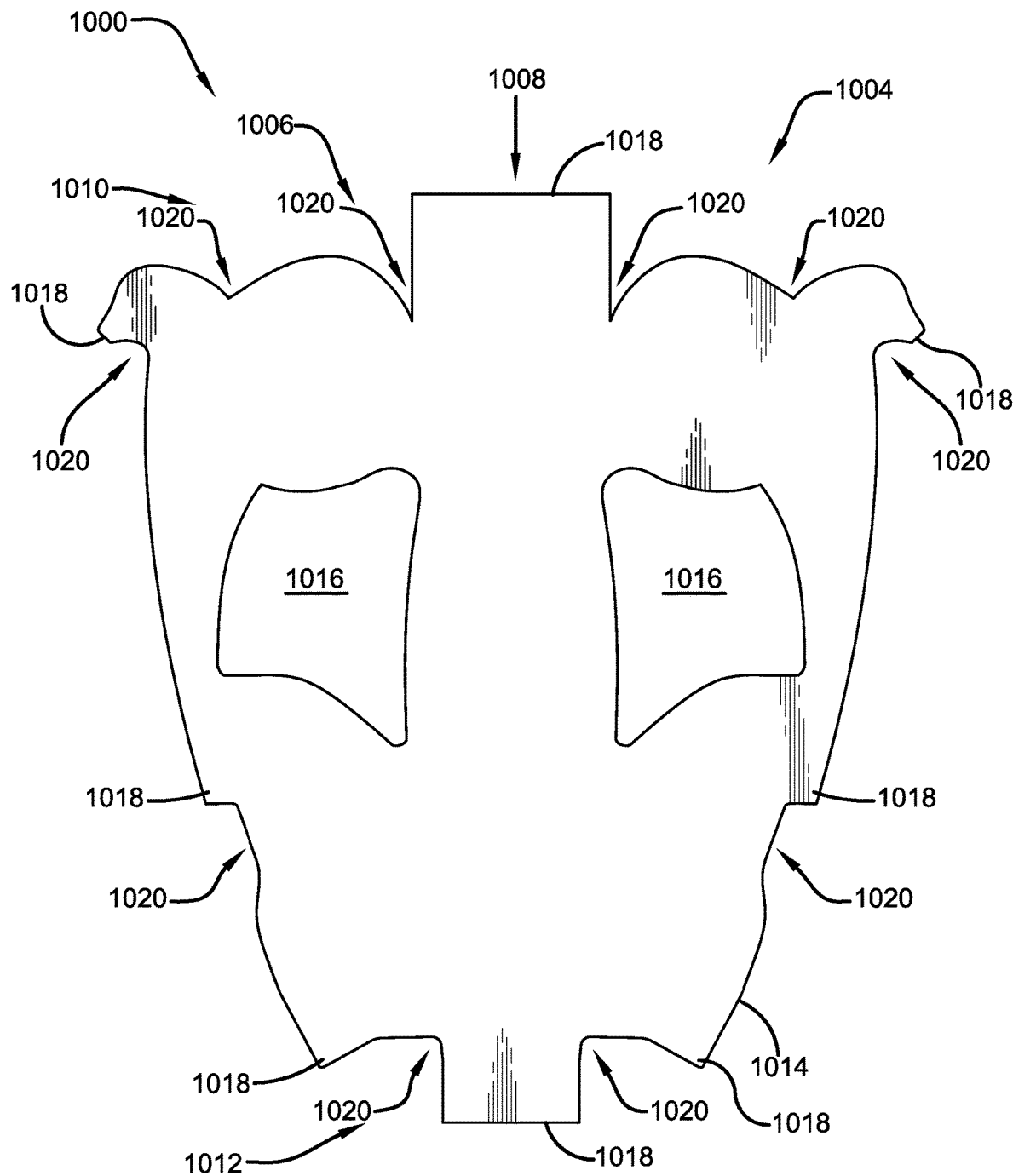
FIG. 11 is a bottom view of the display board shown in FIG. 10.
Figure 12:
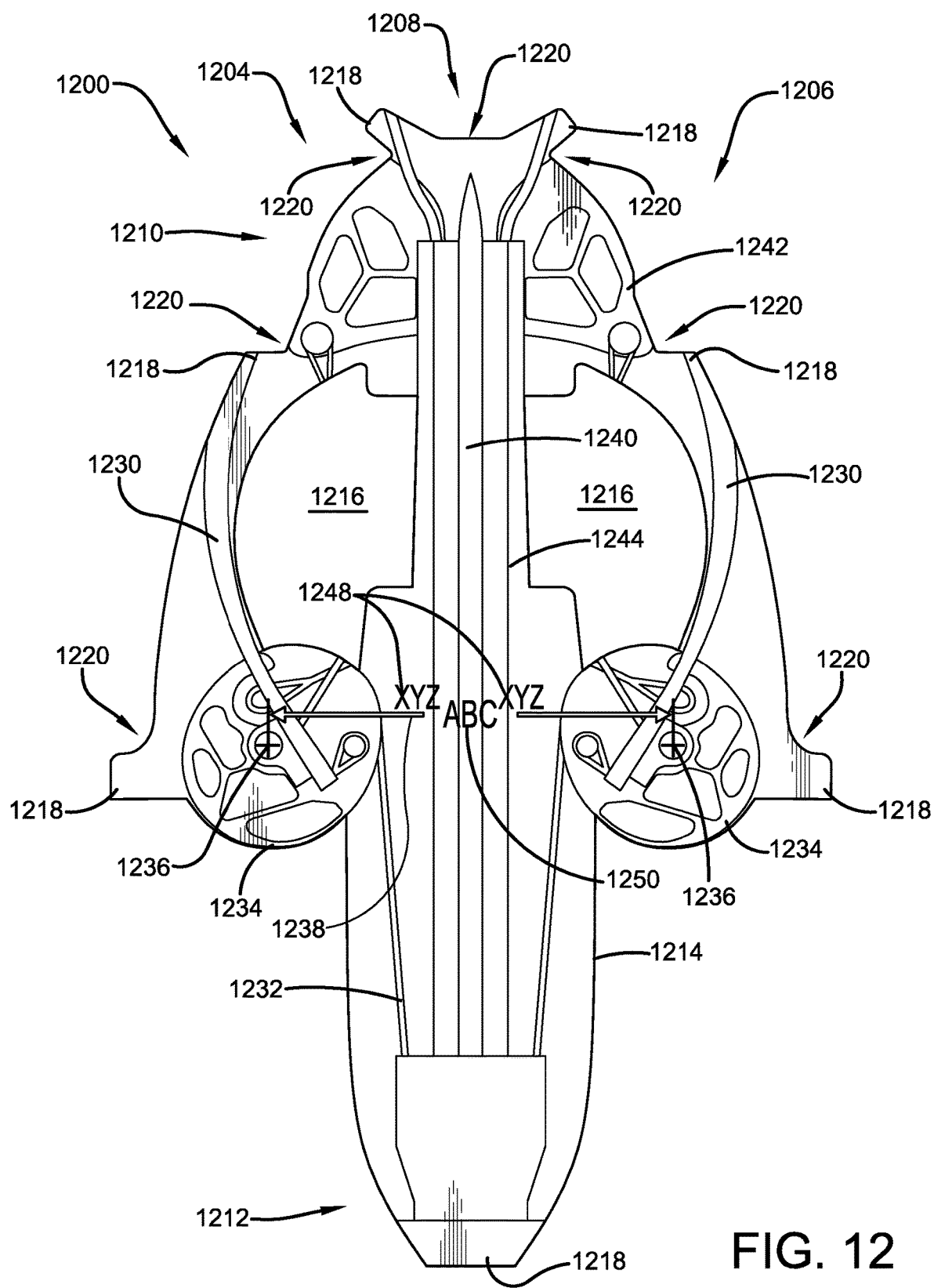
FIG. 12 is a top view of a display board.
Figure 13:
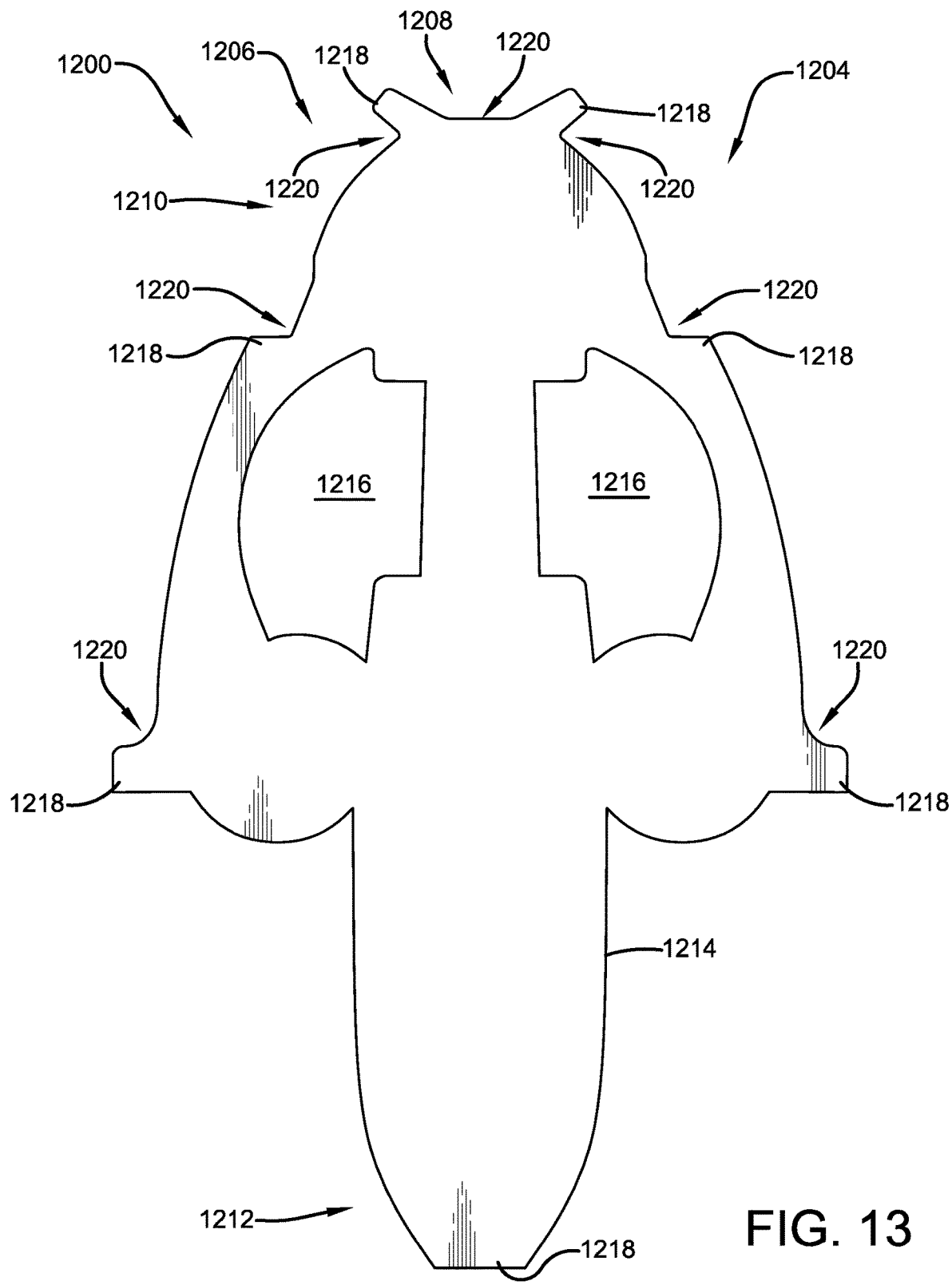
FIG. 13 is a bottom view of the display board shown in FIG. 12.

FIG. 1 illustrates crossbow display 100 including crossbow 102 and display board 800. FIGS. 8 and 9 show display board 800 separate from a crossbow. FIGS. 10 and 11 show display board 1000 that matches the reverse draw crossbow 202 shown in FIGS. 5-7. FIGS. 12-13 show display board 1200 that matches a compound crossbow that is not shown but is of a different size than compound crossbow 102.

With reference to FIGS. 1 and 8-9, display board 800 may have a top (visible in FIG. 8) and a bottom (visible in FIG. 9). Similarly, with reference to FIGS. 10-11, display board 1000 may have a top (visible in FIG. 10) and a bottom (visible in FIG. 11) and, with reference to FIGS. 12-13, display board 1200 may have a top (visible in FIG. 12) and a bottom (visible in FIG. 13). Each display board 800, 1000, 1200 may have first and second sides (804, 806, 1004, 1006, 1204, 1206, respectively), a mid-section between the sides (808, 1008, 1208, respectively), first and second opposite ends (810, 812, 1010, 1012, 1210, 1212, respectively) and a periphery (814, 1014, 1214, respectively). Each display board 800, 1000, 1200 may have display board openings between the mid-section and the sides (816, 816, 1016, 1016, 1216, 1216 respectively) and each periphery may have one or more tabs (818, 1018, 1218, respectively) and/or one or more grooves (820, 1020, 1220, respectively).

With reference now to FIGS. 1, 8, 10 and 12, a display board may have one or more distinct images that are positioned on the top of the display board. In some embodiments, an image may depict at least a portion of the bow assembly when the crossbow is in the cocked state. Thus, when the display board is supported to a crossbow in the un-cocked state, prospective crossbow purchasers/users can see at least a portion of the bow assembly as it would be when the crossbow is in the un-cocked state (sometimes referred to as the first position) and simultaneously see at least a portion of the bow assembly as it would be when the crossbow is in the cocked state (sometimes referred to as the second position) via the image.

FIG. 1, for example, shows crossbow 102 in an un-cocked state with many parts of the crossbow 102 visible; including: first and second bow limbs 118, 118; bowstring 122; first and second wheels 120, 120; pivot axes 130, 130; and the distance between the axes. The display board 800, seen in FIGS. 1 and 8, may include one or more distinct images of the crossbow in a cocked state; such as: images 830, 830 depicting the first and second bow limbs; image 832 depicting the bowstring; images 834, 834 depicting the first and second wheels; and images 836, 836 depicting the pivot axes. In some embodiments, the display board 800 may include one or more images depicting the distance between the axes. In one embodiment, image 838 depicts this distance in the form of a two headed arrow that extends between the axes (or is positioned juxtaposed to the axes, as shown). In another embodiment, image 848 depicts this distance in the form of alphanumeric characters that provide the measurement of the distance. In place of the generic ABC, for example, image 848 may be "9 IN" (indicating that the distance between the axes is 9 inches). Image 848 may be above or below image 838. In another embodiment, shown, image 838 has a gap between its ends and image 848 is positioned within the gap. In yet another embodiment, image 850 depicts this distance in the form of alphanumeric characters that describe the distance. In place of the generic XYZ XYZ, for example, image 850 may be "SUPPER NARROW" (indicating that the distance between the axes is small when the crossbow is in the cocked state). It should be understood that these are exemplary only—any display board image chosen with the sound judgement of a person of skill in the art that depicts at least a portion of the bow assembly when the crossbow is in the cocked state may be used with this invention. In some embodiments, the display board 800 may have other distinct images of the crossbow and/or crossbow related components such as image 840 depicting part or all of an arrow; image 842 depicting part or all of the riser and image 844 depicting all or part the main beam. In some embodiments the display board 800 may have one or more other images such as wording explaining crossbow operation and/or capabilities, safety instructions, and manufacturing information.

The display board 1000, seen in FIG. 10, may include one or more distinct images of the crossbow 202 (shown in FIG. 7) in a cocked state; such as: images 1030, 1030 depicting the first and second bow limbs; image 1032 depicting the bowstring; images 1034, 1034 depicting the first and second wheels; and images 1036, 1036 depicting the pivot axes. In some embodiments, the display board 1000 may include one or more images depicting the distance between the axes. In one embodiment, image 1038 depicts this distance in the form of a two headed arrow that extends between the axes (or is positioned juxtaposed to the axes, as shown). In another embodiment, image 1050 depicts this distance in the form of alphanumeric characters that provide the measurement of the distance. In place of the generic ABC, for example, image 1050 may be "7 IN" (indicating that the distance between the axes is 7 inches). Image 1050 may be above or below image 1038. In another embodiment, shown, image 1038 has a gap between its ends and image 1050 is positioned within the gap. In yet another embodiment, image 1048 depicts this distance in the form of alphanumeric characters that describe the distance. In place of the generic XYZ XYZ, for example, image 1048 may be "ULTRA NARROW" (indicating that the distance between the axes is very small when the crossbow is in the cocked state). It should be understood that these are exemplary only—any display board image chosen with the sound judgement of a person of skill in the art that depicts at least a portion of the bow assembly when the crossbow is in the cocked state may be used with this invention. In some embodiments the display board 1000 may have other distinct images of the crossbow and/or crossbow related components such as image 1040 depicting part or all of an arrow; image 1042 depicting part or all of the riser and image 1044 depicting all or part the main beam. In some embodiments the display board 1000 may have one or more other images such as wording explaining crossbow operation and/or capabilities, safety instructions, and manufacturing information.

The display board 1200, seen in FIG. 12, may include one or more distinct images of a crossbow (the actual crossbow is not shown) in a cocked state; such as: images 1230, 1230 depicting the first and second bow limbs; image 1232 depicting the bowstring; images 1234, 1234 depicting the first and second wheels; and images 1236, 1236 depicting the pivot axes. In some embodiments, the display board 1200 may include one or more images depicting the distance between the axes. In one embodiment, image 1238 depicts this distance in the form of a two headed arrow that extends between the axes (or is positioned juxtaposed to the axes, as shown). In another embodiment, image 1250 depicts this distance in the form of alphanumeric characters that provide the measurement of the distance. In place of the generic ABC, for example, image 1250 may be "6 IN" (indicating that the distance between the axes is 6 inches). Image 1250 may be above or below image 1238. In another embodiment, shown, image 1238 has a gap between its ends and image 1250 is positioned within the gap. In yet another embodiment, image 1248 depicts this distance in the form of alphanumeric characters that describe the distance. In place of the generic XYZ XYZ, for example, image 1248 may be "ULTRA NARROW" (indicating that the distance between the axes is small when the crossbow is in the cocked state). It should be understood that these are exemplary only—any display board image chosen with the sound judgement of a person of skill in the art that depicts at least a portion of the bow assembly when the crossbow is in the cocked state may be used with this invention. In some embodiments the display board 1200 may have other distinct images of the crossbow and/or crossbow related components such as image 1240 depicting part or all of an arrow; image 1242 depicting part or all of the riser and image 1244 depicting all or part the main beam. In some embodiments the display board 1200 may have one or more other images such as wording explaining crossbow operation and/or capabilities, safety instructions, and manufacturing information.

In operation, to display a crossbow, a display board may be chosen that matches the corresponding crossbow. With the crossbow to be displayed in the un-cocked state, the matching display board may then be supported to the crossbow. The display board may be supported to the matching crossbow in any manner chosen with the sound judgment of a person of skill in the art. In some embodiments, shown in FIGS. 1-2 and 8-9, the second end 812 of the display board 800 is supported to the trigger mechanism 124 and the first end 810 of the display board 800 is supported to the distal end 128 of the crossbow 102. Alternatively, or in addition, also shown in FIGS. 1-2 and 8-9, the first side 804 of the display board 800 may be supported to a first bow limb 118 and the second side 806 of the display board 800 may be supported to a second bow limb 118. The display board 1000 shown in FIGS. 10-11 may similarly be supported to the crossbow 202 shown in FIGS. 5-7. The display board 1000 shown in FIGS. 12-13 may similarly be supported to a matching crossbow, not shown.

In some embodiments, the display board may be supported to the matching crossbow by having one or more tabs formed on the display board contacting one or more surfaces on the crossbow and/or by having one or more grooves formed on the display board receiving one or more surfaces of the crossbow. In one embodiment, the lowest tab 818 shown in FIGS. 8 and 9 may contact crossbow surface 150 shown in FIG. 2. In another embodiment, grooves 820, 820 that are also referenced 821, 821 in FIG. 8 may receive crossbow surfaces that define the pivot axes 130, such as surface 152 in FIG. 2. In yet another embodiment, grooves 820, 820 that are also referenced 823, 823 in FIG. 8 may receive crossbow surfaces that define the distal tips of the bow limbs, such as surfaces 154, 154 in FIG. 3. In still another embodiment, grooves 820, 820 that are also referenced 825, 825 in FIG. 8 may receive inwardly extending crossbow surfaces 156, 156 in FIG. 3. It should be understood that the engagement between display board tabs and/or grooves with crossbow surfaces can be of any size and type chosen with the sound judgement of a person of skill in the art.

With reference now especially to FIG. 1, when the crossbow is displayed with the display board properly in place, various embodiments regarding their relative positions are possible; including: the mid-section of the display board may overlap at least a portion of the main beam (the mid-section 808 of display board 800, for example, is shown to overlap at least a portion of the main beam 112 of crossbow 102); at least one of the display board openings may overlap at least a portion of at least one of the crossbow openings (both of the openings 816, 816 of display board 800, for example, are shown to overlap at least a portion of the openings 132, 134 of crossbow 102); the top of the display board may face away from the top of the crossbow; the display board may not overlap top surfaces of the first and second bow limbs (bow limbs 118, 118 are not overlapped by the display board 800); and the crossbow wheels may be visible and juxtaposed to the corresponding wheel images (wheels 120, 120 are visible and juxtaposed to wheel images 834, 834).

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof. Further, the "invention" as that term is used in this document is what is claimed in the claims of this document. The right to claim elements and/or sub-combinations that are disclosed herein as other inventions in other patent documents is hereby unconditionally reserved.

I claim:
1. A crossbow display comprising:
   A) a crossbow that:
      1) has a main beam;
      2) has a bow assembly supported to the main beam that includes: first and second bow limbs; first and second wheels pivotally supported to the first and second bow limbs, respectively; and a bowstring operatively received on the first and second wheels;
      3) has a trigger mechanism supported to the main beam and operable to: hold the bowstring; and release the bowstring to fire the crossbow;
      4) is adjustable between an un-cocked state and a cocked state;
      5) when in the un-cocked state: the first wheel is in a first wheel first position; and the second wheel is in a second wheel first position; and
      6) when in the cocked state: the trigger mechanism holds the bowstring; the first wheel is in a first wheel second position distinct from the first wheel first position; and the second wheel is in a second wheel second position distinct from the second wheel first position; and
   B) a display board that:
      1) has first and second sides;
      2) has first and second distinct images; and
      3) is designed to be removed from the crossbow when the crossbow is not displayed;
   C) wherein when the crossbow is displayed:
      1) the crossbow is in the un-cocked state;
      2) the first side of the display board is supported to the first bow limb;
      3) the second side of the display board is supported to the second bow limb;
      4) the first image depicts at least a portion of the first wheel in the first wheel second position; and
      5) the second image depicts at least a portion of the second wheel in the second wheel second position.

2. The crossbow display of claim 1 wherein:
the crossbow has a proximal end and a distal end;
the trigger mechanism is positioned closer to the proximal end than the distal end;
the display board has a first end and a second end opposite the first end; and
when the crossbow is displayed: the first end of the display board is supported to the trigger mechanism and the second end of the display board is supported to the distal end of the crossbow.

3. The crossbow display of claim 2 wherein:
the display board has: a periphery having at least one tab and at least one groove; and
when the crossbow is displayed: the at least one tab contacts a first crossbow surface to support the display board to the crossbow; and the at least one groove receives a second crossbow surface to support the display board to the crossbow.

4. The crossbow display of claim 3 wherein:
the crossbow has: a first crossbow opening between the main beam and the first bow limb; and a second crossbow opening between the main beam and the second bow limb;
the display board has: a mid-section between the first and second sides; a first display board opening between the mid-section and the first side; and a second display board opening between the mid-section and the second side; and when the crossbow is displayed: the mid-section of the display board overlaps at least a portion of the main beam; the first display board opening overlaps at least a portion of the first crossbow opening; and the second display board opening overlaps at least a portion of the second crossbow opening.

5. The crossbow display of claim 1 wherein:
the crossbow has a top and a bottom;
the display board has a top and a bottom;
the first and second images are positioned on the top of the display board; and
when the crossbow is displayed: the top of the display board faces away from the top of the crossbow.

6. The crossbow display of claim 5 wherein when the crossbow is displayed:
the display board does not overlap top surfaces of the first and second bow limbs.

7. The crossbow display of claim 1 wherein when the crossbow is displayed:
at least a portion of the first wheel in the first wheel first position is visible and juxtaposed to the first image; and
at least a portion of the second wheel in the second wheel first position is visible and juxtaposed to the second image.

8. The crossbow display of claim 7 wherein:
the first wheel is pivotable about a first axis with respect to the first bow limb;
the second wheel is pivotable about a second axis with respect to the second bow limb;
when the crossbow is in the un-cocked state the first and second axes are separated by a first distance;
when the crossbow is in the cocked state the first and second axes are separated by a second distance distinct from the first distance;
a third distinct image is positioned on the display board; and
when the crossbow is displayed: the third image indicates the second distance.

9. A method of displaying a crossbow comprising the steps of:
A) providing a crossbow that:
1) has a main beam;
2) has a bow assembly supported to the main beam that includes: first and second bow limbs; first and second wheels supported to the first and second bow limbs, respectively; and a bowstring operatively received on the first and second wheels;
3) has a trigger mechanism supported to the main beam and operable to: hold the bowstring; and release the bowstring to fire the crossbow;
4) is adjustable between an un-cocked state and a cocked state;
5) when in the un-cocked state: the first wheel is in a first wheel first position; and the second wheel is in a second wheel first position; and
6) when in the cocked state: the trigger mechanism holds the bowstring; the first wheel is in a first wheel second position distinct from the first wheel first position; and the second wheel is in a second wheel second position distinct from the second wheel first position;

B) providing a display board that:
1) has first and second distinct images; and
2) is designed to be removed from the crossbow when the crossbow is not displayed; and
C) displaying the crossbow by:
1) placing the crossbow into the un-cocked state;
2) supporting the display board to the crossbow with:
(a) the first image depicting at least a portion of the first wheel in the first wheel second position; and
(b) the second image depicting at least a portion of the second wheel in the second wheel second position.

10. The method of displaying a crossbow of claim 9 wherein:
step A comprises the steps of: providing the crossbow with a proximal end and a distal end; and providing the trigger mechanism to be positioned closer to the proximal end than the distal end;
step B comprises the step of: providing the display board with a first end and a second end opposite the first end; and
step C2 comprises the steps of: supporting the first end of the display board to the trigger mechanism; and supporting the second end of the display board to the distal end of the crossbow.

11. The method of displaying a crossbow of claim 9 wherein:
step A comprises the steps of: providing the crossbow with first and second surfaces;
step B comprises the step of: providing the display board with a periphery having at least one tab and at least one groove; and
step C2 comprises the steps of: contacting the first surface with the at least one tab; and receiving the second surface within the at least one groove.

12. The method of displaying a crossbow of claim 9 wherein:
step A comprises the steps of: providing the crossbow with: a first crossbow opening between the main beam and the first bow limb; and a second crossbow opening between the main beam and the second bow limb;
step B comprises the step of: providing the display board with: first and second sides; a mid-section between the first and second sides; a first display board opening between the mid-section and the first side; and a second display board opening between the mid-section and the second side; and
step C2 comprises the steps of: overlapping at least a portion of the main beam with the mid-section of the display board; overlapping at least a portion of the first crossbow opening with the first display board opening; and overlapping at least a portion of the second crossbow opening with the second display board opening.

13. The method of displaying a crossbow of claim 9 wherein:
step A comprises the steps of: providing the crossbow with a top and a bottom;
step B comprises the step of: providing the display board with a top and a bottom; and displaying the first and second images on the top of the display board; and
step C2 comprises the step of: facing the top of the display board away from the top of the crossbow.

14. The method of displaying a crossbow of claim 9 wherein step C2 comprises the steps of:
making visible at least a portion of the first wheel in the first wheel first position juxtaposed to the first image; and making visible at least a portion of the second wheel in the second wheel first position juxtaposed to the second image.

15. A crossbow display comprising:
A) a crossbow that:
 1) has a main beam;
 2) has a bow assembly supported to the main beam that includes: first and second bow limbs; and a bowstring operatively received on the first and second bow limbs;
 3) has a trigger mechanism supported to the main beam and operable to: hold the bowstring; and release the bowstring to fire the crossbow;
 4) is adjustable between an un-cocked state and a cocked state;
 5) when in the un-cocked state: the bow assembly is in a first position; and
 6) when in the cocked state: the trigger mechanism holds the bowstring; and at least a portion of the bow assembly is in a second position distinct from the first position; and
B) a display board that:
 1) has a first image; and
 2) is designed to be removed from the crossbow when the crossbow is not displayed;
C) wherein when the crossbow is displayed:
 1) the crossbow is in the un-cocked state;
 2) the display board is supported to the crossbow; and
 3) the first image depicts at least a portion of the bow assembly in the second position.

16. The crossbow display of claim 15 wherein:
the bow assembly first position includes: the first bow limb in a first bow limb first position; and the second bow limb in a second bow limb first position;
the bow assembly second position includes: the first bow limb in a first bow limb second position distinct from the first bow limb first position; and the second bow limb in a second bow limb second position distinct from the second bow limb first position;
the first image depicts at least a portion of the first bow limb in the first bow limb second position;
the display board has a second distinct image; and
the second image depicts at least a portion of the second bow limb in the second bow limb second position.

17. The crossbow display of claim 16 wherein:
the bow assembly includes: first and second wheels supported to the first and second bow limbs, respectively, with the bowstring operatively received on the first and second wheels;
the bow assembly first position includes: the first wheel in a first wheel first position; and the second wheel in a second wheel first position;
the bow assembly second position includes: the first wheel in a first wheel second position distinct from the first wheel first position; and the second wheel in a second wheel second position distinct from the second wheel first position;
the display board has third and fourth distinct images;
the third image depicts at least a portion of the first wheel in the first wheel second position; and
the fourth image depicts at least a portion of the second wheel in the second wheel second position.

18. The crossbow display of claim 17 wherein:
the first wheel is pivotable about a first axis with respect to the first bow limb;
the second wheel is pivotable about a second axis with respect to the second bow limb;
the bow assembly first position includes: the first and second axes are separated by a first distance;
the bow assembly second position includes: the first and second axes are separated by a second distance distinct from the first distance;
the display board has a fifth distinct image; and
the fifth image indicates the second distance.

19. The crossbow display of claim 18 wherein when the crossbow is displayed:
at least a portion of the first wheel in the first wheel first position is visible and juxtaposed to the third image; and
at least a portion of the second wheel in the second wheel first position is visible and juxtaposed to the fourth image.

20. The crossbow display of claim 19 wherein:
the display board has a first side; a second side; and a mid-section between the first and second sides;
the display board has a sixth distinct image positioned on the mid-section of the display board; and
when the crossbow is displayed:
 1) the mid-section of the display board overlaps at least a portion of the main beam;
 2) the first side of the display board is supported to the first bow limb;
 3) the second side of the display board is supported to the second bow limb; and
 4) the sixth image depicts at least a portion of an arrow.

* * * * *